(12) United States Patent
Itoh

(10) Patent No.: US 7,446,905 B2
(45) Date of Patent: Nov. 4, 2008

(54) FACSIMILE APPARATUS, AND FACSIMILE TRANSMISSION MEANS, AND FACSIMILE TRANSMISSION METHOD

(75) Inventor: Nobuhiro Itoh, Saitama (JP)

(73) Assignee: Ricoh Company, Ltd, Tokyo (JP)

( * ) Notice: Subject to any disclaimer, the term of this patent is extended or adjusted under 35 U.S.C. 154(b) by 934 days.

(21) Appl. No.: 10/863,873

(22) Filed: Jun. 8, 2004

(65) Prior Publication Data

US 2005/0024694 A1 Feb. 3, 2005

(30) Foreign Application Priority Data

Jul. 28, 2003 (JP) ............... 2003-202273

(51) Int. Cl.
*H04N 1/21* (2006.01)
*H04N 1/46* (2006.01)

(52) U.S. Cl. ............... 358/3.24; 358/500; 358/512

(58) Field of Classification Search ............... 358/400, 358/401, 440, 500, 501, 512, 3.24
See application file for complete search history.

(56) References Cited

U.S. PATENT DOCUMENTS 5,355,159 A * 10/1994 Kaneko ............... 347/19
5,987,227 A * 11/1999 Endo et al. ............... 358/1.13
6,545,771 B1 * 4/2003 Sakai et al. ............... 358/1.9

FOREIGN PATENT DOCUMENTS

| JP | 8-32722 | 2/1996 |
|---|---|---|
| JP | 11-252342 | 9/1999 |
| JP | 2000-78269 | 3/2000 |
| JP | 2000-141828 | 5/2000 |
| JP | 2001-94757 | 4/2001 |
| JP | 2002-101284 | 4/2002 |

OTHER PUBLICATIONS

U.S. Appl. No. 10/054,147 of Nobuhiro Itoh, filed Jan. 21, 2002.
U.S. Appl. No. 10/217,322 of Nobuhiro Itoh, filed Aug. 12, 2002.
Jul. 31, 2007 Japanese official action in connection with corresponding Japanese application No. 2003-202273.

* cited by examiner

*Primary Examiner*—Thomas D Lee
(74) *Attorney, Agent, or Firm*—Cooper & Dunham, LLP

(57) ABSTRACT

A facsimile apparatus having a multi-color printing function is disclosed. The facsimile apparatus includes an information registering part configured to register registration information including book mark printing colors used for printing a book mark corresponding to a sender of a plurality of senders, a determining part configured to determine, based on the registration information, whether to print the book mark when receiving image information from the sender, and a printing part configured to print the book mark corresponding to the sender.

21 Claims, 8 Drawing Sheets

FIG.4

* BOOK MARK DESIGNATION REGISTRATION LIST OF SENDERS *  P.1

AT PRESENT, THIS FUNCTION IS SWITCHED ON.

| REGISTERED SENDER | WILD CARD | PRINTING COLOR | ALTERNATIVE COLOR | CENTER MARK PRINTING | ALTERNATIVE COLOR MARK |
|---|---|---|---|---|---|
| TOKYO BRANCH 1 | ON | YELLOW | BLACK | ON | ON |
| TOKYO BRANCH 2 | ON | MAGENTA | OFF | OFF | OFF |
| OSAKA BRANCH | ON | CYAN | OFF | ON | OFF |

FACSIMILE APPARATUS, AND FACSIMILE TRANSMISSION MEANS, AND FACSIMILE TRANSMISSION METHOD

BACKGROUND

1. Technical Field

This disclosure relates to a facsimile apparatus, a facsimile transmission means, and a facsimile transmission method, and more plarticularly to a facsimile apparatus, a facsimile transmission means, and a facsimile transmission method having a multi-color printing function.

2. Description of the Related Art

In general, it would be convenient for a user of a facsimile apparatus if the facsimile apparatus could easily distinguish a document transmitted from a particular sender, particularly when the facsimile apparatus receives image information from numerous unspecified senders (terminals).

Accordingly, in an example proposed in Japanese Laid-Open Patent Application No.11-252342, a document transmitted from a particular sender is recorded and output with a type of paper or a color of paper that is specified by the user. In another example proposed in Japanese Laid-Open Patent Application No.2000-78269, a ring-tone corresponding to a particular sender is rung whenever receiving a document from the particular sender.

However, the former example has a problem of being unable to record and output the received document when there is no supply of the specified paper. The latter example has a problem of being unnoticed when the user is not sufficiently near the facsimile apparatus to hear or distinguish the ring-tone.

SUMMARY

To achieve these and other advantages and to accordance with the purpose of the invention, as embodied and broadly described herein, the invention provides. In an aspect of this disclosure a facsimile apparatus having a multi-color printing function is provided which includes an information registering pan configured to register registration information including book mark printing colors used for printing a book mark corresponding to a sender of a plurality of sender, and a determining part configured to determine, based on the registration information, whether to print the book mark when receiving image information from the sender, and a printing part configured to print the book mark corresponding to the sender.

In the facsimile apparatus according to an embodiment of the present invention, the registration information may include alternative book mark printing colors used as alternative colors with respect to the book mark printing colors in a case where the book mark printing colors are unavailable.

In the facsimile apparatus according to an embodiment of the present invention, an alternative book mark color mark may be printed in the case where the alternative book mark printing color is used.

In the facsimile apparatus according to an embodiment of the present invention, the registration information may include index mark printing flags that indicate whether an index mark is to be printed, and an index mark printing color used for printing the index mark.

In the facsimile apparatus according to an embodiment of the present invention, the registration information may include alternative index mark printing colors used as alternative colors with respect to the index mark printing colors in a case where the index mark printing colors are unavailable.

In the facsimile apparatus according to an embodiment of the present invention, an alternative index mark color mark may be printed in the case where the alternative index mark printing color is used.

In the facsimile apparatus according to an embodiment of the present invention, the registration information may include center mark flags that indicate whether a center mark is to be printed, and a center mark printing color used for printing the center mark.

In the facsimile apparatus according to an embodiment of the present invention, the registration information may include alternative center mark printing colors used as alternative colors with respect to the center mark printing colors in a case where the center mark printing colors are unavailable.

In the facsimile apparatus according to an embodiment of the present invention, an alternative center mark color mark may be printed in the case where the alternative center mark printing color is used.

In another aspect of this disclosure, a facsimile transmission means having a multi-color printing function, the facsimile transmission means includes means for registering registration information including book mark printing colors used for printing a book mark corresponding to a sender of a plurality of sender, means for determining, based on the registration information, whether to print the book mark when receiving image information from the sender, and means for printing the book mark corresponding to the sender.

In the facsimile transmission means according to an embodiment of the present invention, the registration information may include alternative book mark printing colors used as alternative colors with respect to the book mark printing colors in a case where the book mark printing colors are unavailable.

In the facsimile transmission means according to an embodiment of the present invention, an alternative book mark color mark may be printed in the case where the alternative book mark printing color is used.

In the facsimile transmission means according to an embodiment of the present invention, the registration information may include index mark printing flags that indicate whether an index mark is to be printed, and an index mark printing color used for printing the index mark.

In the facsimile transmission means according to an embodiment of the present invention, the registration information may include alternative index mark printing colors used as alternative colors with respect to the index mark printing colors in a case where the index mark printing colors are unavailable.

In the facsimile transmission means according to an embodiment of the present invention, an alternative index mark color mark may be printed in the case where the alternative index mark printing color is used.

In the facsimile transmission means according to an embodiment of the present invention, the registration information may include center mark flags that indicate whether a center mark is to be printed, and a center mark printing color used for printing the center mark.

In the facsimile transmission means according to an embodiment of the present invention, the registration information may include alternative center mark printing colors used as alternative colors with respect to the center mark printing colors in a case where the center mark printing colors are unavailable.

In the facsimile transmission means according to an embodiment of the present invention, an alternative center mark color mark may be printed in the case where the alternative printing center mark color is used.

This disclose also provides a facsimile transmission method including the steps of a) registering registration information including book mark printing colors used for printing a book mark corresponding to a sender of a plurality of sender, b) determining, based on the registration information, whether to print the book mark when receiving image information from the sender, and c) priming the book mark corresponding to the sender.

In the facsimile transmission method according to an embodiment of the present invention, the registration information may include alternative book mark printing colors used as alternative colors with respect to the book mark printing colors in a case where the book mark printing colors are unavailable.

In the facsimile transmission method according to an embodiment of the present invention, an alternative book mark color mark may be printed in the case where the alternative book mark printing color is used.

In the facsimile transmission method according to an embodiment of the present invention, the registration information may include index mark printing flags that indicate whether an index mark is to be printed, and an index mark printing color used for printing the index mark.

In the facsimile transmission method according to an embodiment of the present invention, the registration information may include alternative index mark printing colors used as alternative colors with respect to the index mark printing colors in a case where the index mark printing colors are unavailable.

In the facsimile transmission method according to an embodiment of the present invention, an alternative index mark color mark may be printed in the case where the alternative index mark printing color is used.

In the facsimile transmission method according to an embodiment of the present invention, the registration information may include center mark flags that indicate whether a center mark is to be printed, and a center mark printing color used for printing the center mark.

In the facsimile transmission method according to an embodiment of the present invention, the registration information may include alternative center mark printing colors used as alternative colors with respect to the center mark printing colors in a case where the center mark printing colors are unavailable.

In the facsimile transmission method according to an embodiment of the present invention, an alternative center mark color mark may be printed in the case where the alternative printing center mark color is used.

Other aspect and further features of the present invention will be apparent from the following detailed description when read in conjunction with the accompanying drawings.

BRIEF DESCRIPTION OF THE DRAWINGS

FIG. 4 is a schematic diagram showing an exemplary report in a case where registration information of a book mark designation information table is output as a report;

DESCRIPTION OF THE PREFERRED EMBODIMENTS

In the following, embodiments of the present invention will be described in detail with reference to the accompanying drawings.

Figure 1:
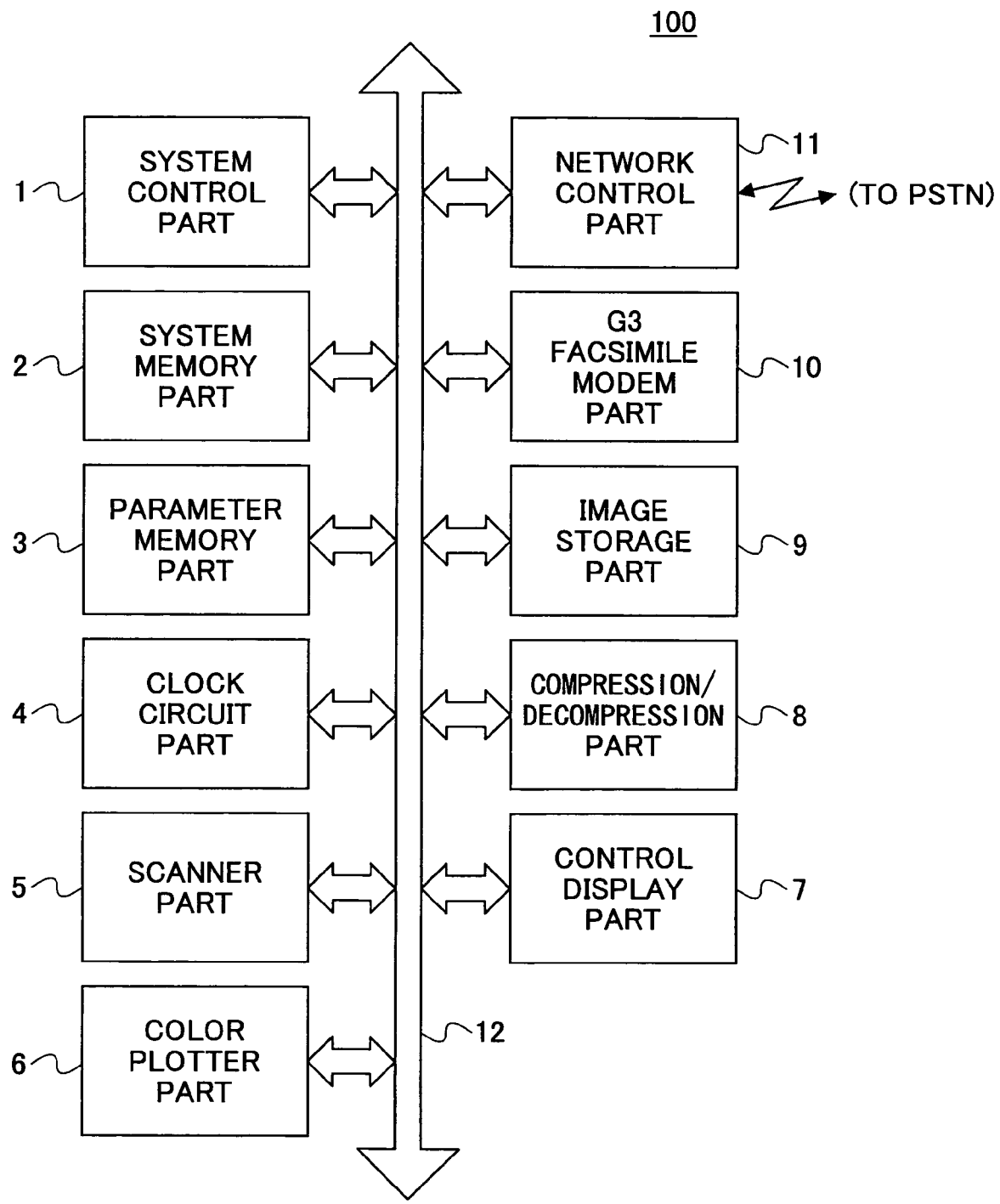
FIG. 1 is a block diagram of a Group 3 facsimile apparatus according to an embodiment of the present invention.

FIG. 1 is a block diagram of a G3 (Group 3) facsimile apparatus 100 according to an embodiment of the present invention.

FIG. 1 shows a system control part 1 for controlling respective parts of the G3 facsimile apparatus 100, and for executing prescribed processes of the G3 facsimile apparatus 100. A system memory 2 stores various data required by the system control part 1 for controlling respective parts of the G3 facsimile apparatus 100 and for executing processes of the G3 facsimile apparatus 100, and provides a work area for the system control part 1. A parameter memory 3 stores various information that is inherent in the G3 facsimile apparatus 100. A clock circuit 4 outputs present time information. A scanner part 5 reads out image information of a document in a prescribed resolution. A color plotter 6 records and outputs image information with a prescribed color in a prescribed resolution. For example, the color plotter 6 uses the three color components of cyan, magenta, and yellow for recording and outputting multi-color documents (both mono-color and full color).

A control display part 7, which enables operation of the G3 facsimile apparatus 100, includes various operation keys and various displays.

An encode/decode part 7 serves to encode (compress) image signals and to decode (decompress) encoded image information to its original image signal. An image storage apparatus 9 serves to store a vast amount of encoded (compressed) image information.

A group 3 (G3) facsimile modem 10 serves as a modem providing G3 facsimile functions including a low speed modem function for intercommunication of transmission process signals (e.g. V.21 modem), and a high speed modem function for intercommunication of mainly image information (e.g. V.17 modem, V.34 modem, V.29 modem, V.27 ter modem).

A network control apparatus 11, serving to connect the G3 facsimile apparatus to an analogue public network (PSTN), is provided with an automatic signal transmission function.

The above-described system control part 1, the system memory part 2, the parameter memory part 3, the clock circuit part 4, the scanner part 5, the plotter part 6, the control display part 7, the encode/decode part 8, the image storage part 9, the G3 facsimile modem part 10, and the network control part 11 are connected to an internal bus 12. The intercommunications of data between the above-described parts are performed via the internal bus 12.

The intercommunication of data between the network control part 11 and the G3 facsimile modem 10 may be performed directly.

Figure 2A:
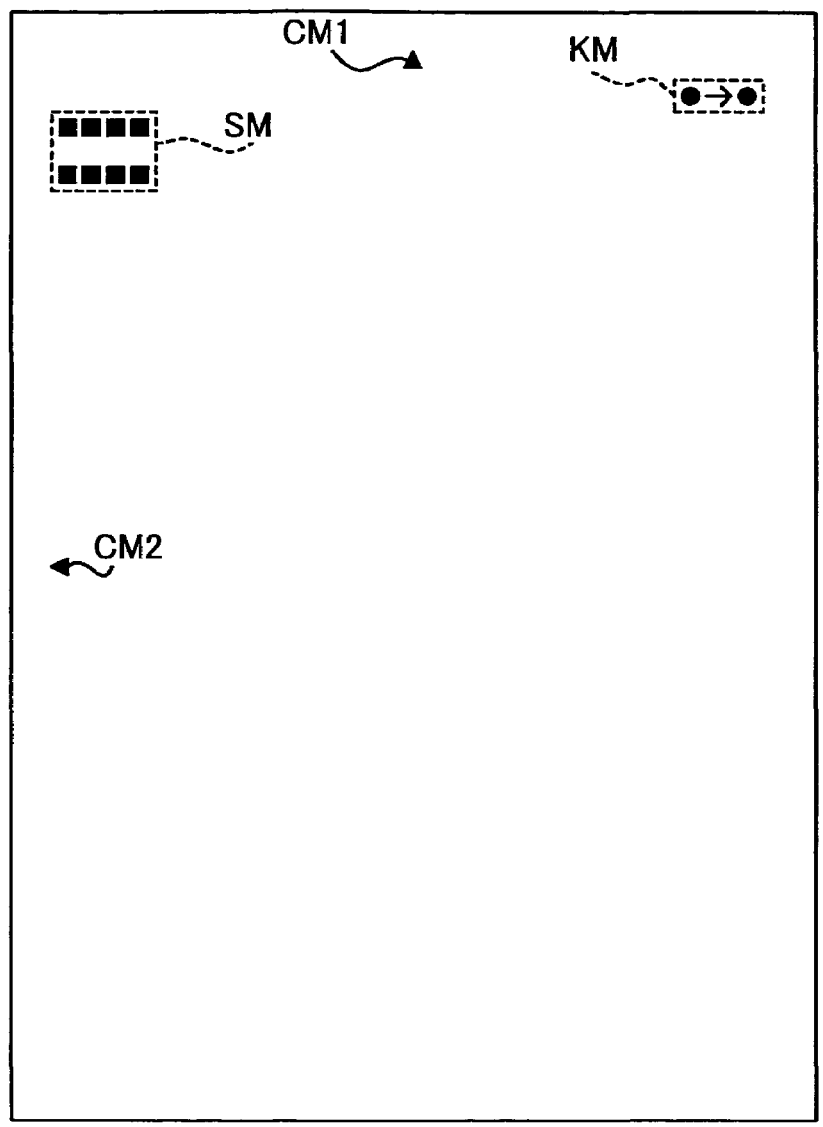
FIGS. 2A and 2B are schematic diagrams showing examples of a book mark, center marks, and alternative color mark that are to be printed onto a received document.

In the G3 facsimile apparatus 100 according to an embodiment of the present invention, book marks, for example are recorded onto a received document as shown, for example, in FIG. 2A.

A center mark (CM) 1 serves to indicate a center position of a paper in its lateral direction, and a center mark (CM) 2 serves to indicate a center position of the paper in its longitudinal direction. The center marks CM1 and CM2 may be printed onto a page, and in one embodiment on each page. An index mark SM serves to indicate a delimitation of a unit of a printing job (receiving job), and may be printed (appended) on a page, and in one embodiment it is printed on the first page of a document or printing job.

In printing the center marks CM1, CM2, and the index mark SM onto a received document, the center marks CM1, CM2, and the index mark SM are printed thereon with a pre-registered printing color corresponding to a sender, for example, the terminal of the sender or other source identification information of the sender.

Furthermore, in a case where the pre-registered printing color cannot be applied, for example, a case where there is a shortage of toner or ink in the color plotter 6, a predetermined alternative color may be used for printing the center marks CM1, CM2, and the index mark SM.

Furthermore, in the case of using the alternative color, an alternative color mark KM may be additionally printed onto a page on which information is printed.

Figure 2B:
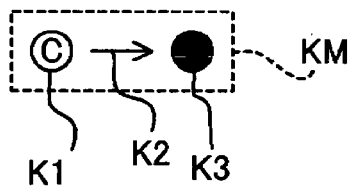

As shown in FIG. 2B, the alternative color mark KM includes a mark K1 indicative of the pre-registered printing color, an arrow K2 pointing rightward, and a mark K3 colored over with the predetermined alternative color. This allows the printing color and the alternative color for the center marks C1, C2, and/or the index mark SM to be instantly recognizable. In FIG. 2B, a letter "C" for indicating cyan is recorded (printed) with a default color (usually, black) at a center portion of mark K1. Here, the letter "M" indicates magenta, the letter "Y" indicates yellow, and the letter "B" indicates black.

Figure 3A:
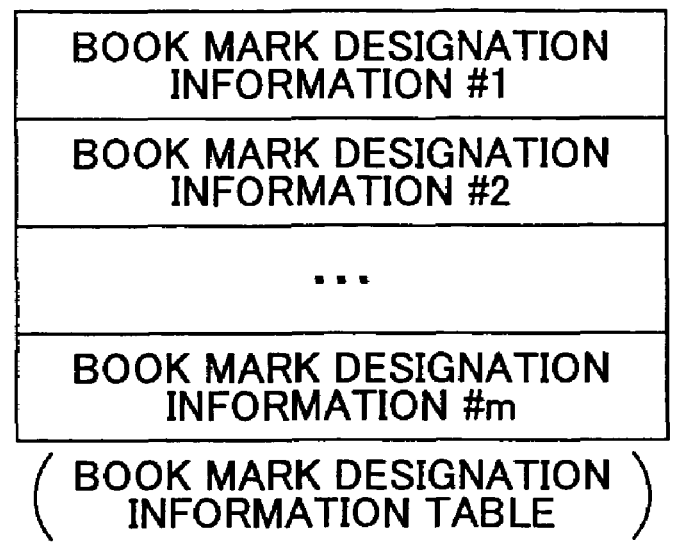
FIGS. 3A, 3B, and 3C are schematic diagrams showing a book mark designation information table, book mark designation information, and apparatus specification information, respectively.

As shown in FIG. 3A, a book mark designation information table has, for example, the printing colors for the center marks CM1, CM2, and the index mark SM recorded thereto.

Figure 3B:
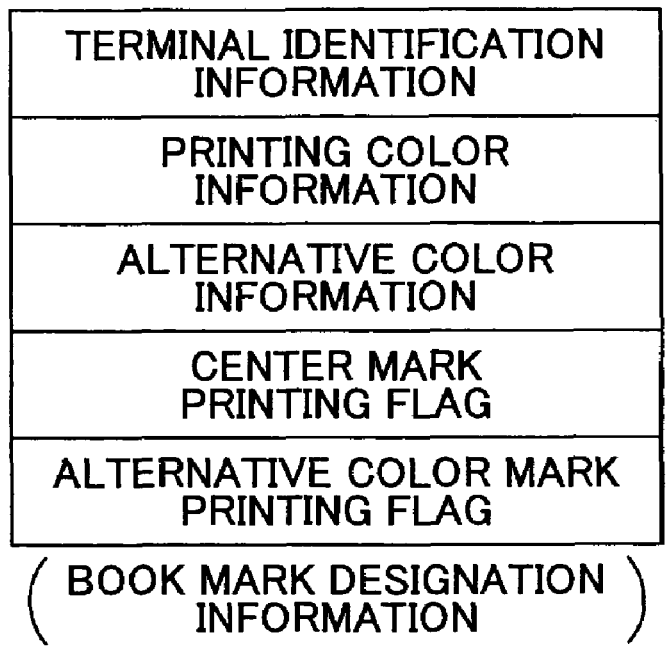

The book mark designation information table includes one or more book mark designation information. As shown in FIG. 3B, the book mark designation information includes terminal identification information (CSI/RTI), printing color information indicating a designated printing color, alternative color information indicating a designated alternative color, a center mark printing flag indicating whether to print the center marks CM1, CM2, and an alternative color printing flag indicating whether to print the alternative color mark.

It is to be noted that there is a case where no particular information (significant information) is recorded to the alternative color information. In this case, a system default color (usually, black) is printed.

Figure 3C:
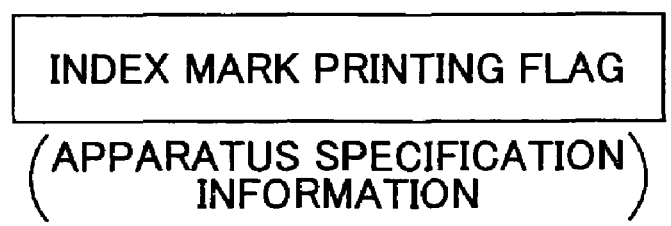

Furthermore, an index mark printing flag indicating whether to print the index mark is registered as apparatus specification information as shown in FIG. 3C.

Furthermore, the user may output the content registered in the book mark designation information table and use it as a report. When the user designates the output of the book mark designation information table as a report, the G3 facsimile apparatus 100 prints out the report, for example, as shown in FIG. 4.

Figure 5:
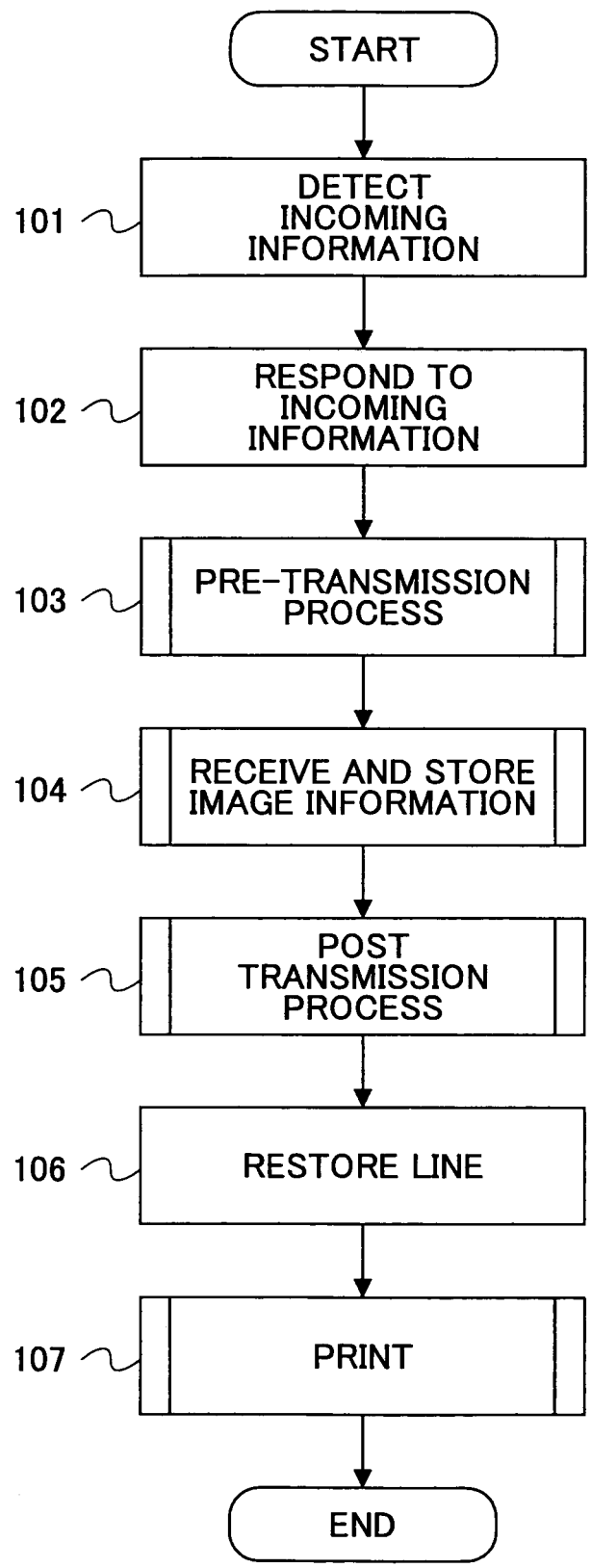
FIG. 5 is a flowchart showing an exemplary process of a Group 3 facsimile apparatus during a receiving operation.

FIG. 5 is a block diagram showing an exemplary operation process of a G3 facsimile apparatus during reception according to an embodiment of the present invention.

First, when incoming image information is detected (Step 101), the G3 facsimile apparatus 100 responds to the incoming image information (Step 102), and performs a pre-transmission process including obtainment of sender information (Step 103). Then, the G3 facsimile apparatus 100 receives the image information, and temporarily stores the received image information (Step 104). After the reception of the image information is completed, the G3 facsimile apparatus 100 performs a post-transmission process (Step 105). Then, the G3 facsimile apparatus 100 restores its line (Step 106), and performs a printing process on the image information stored in Step 104 (Step 107).

Figure 6:
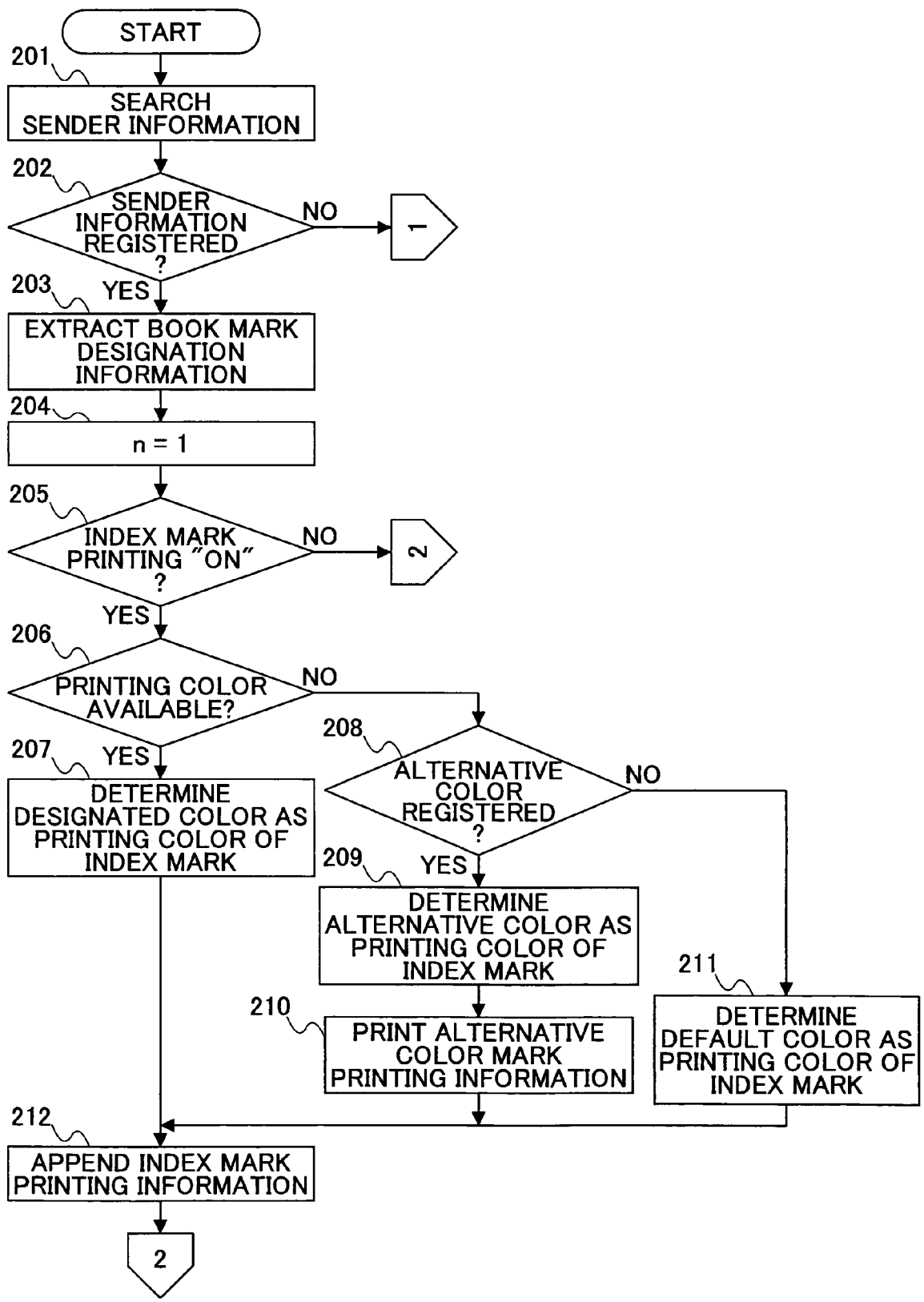
FIG. 6 is a flowchart showing an exemplary printing process (Step 107) of the FIG. 5 process.
Figure 7:
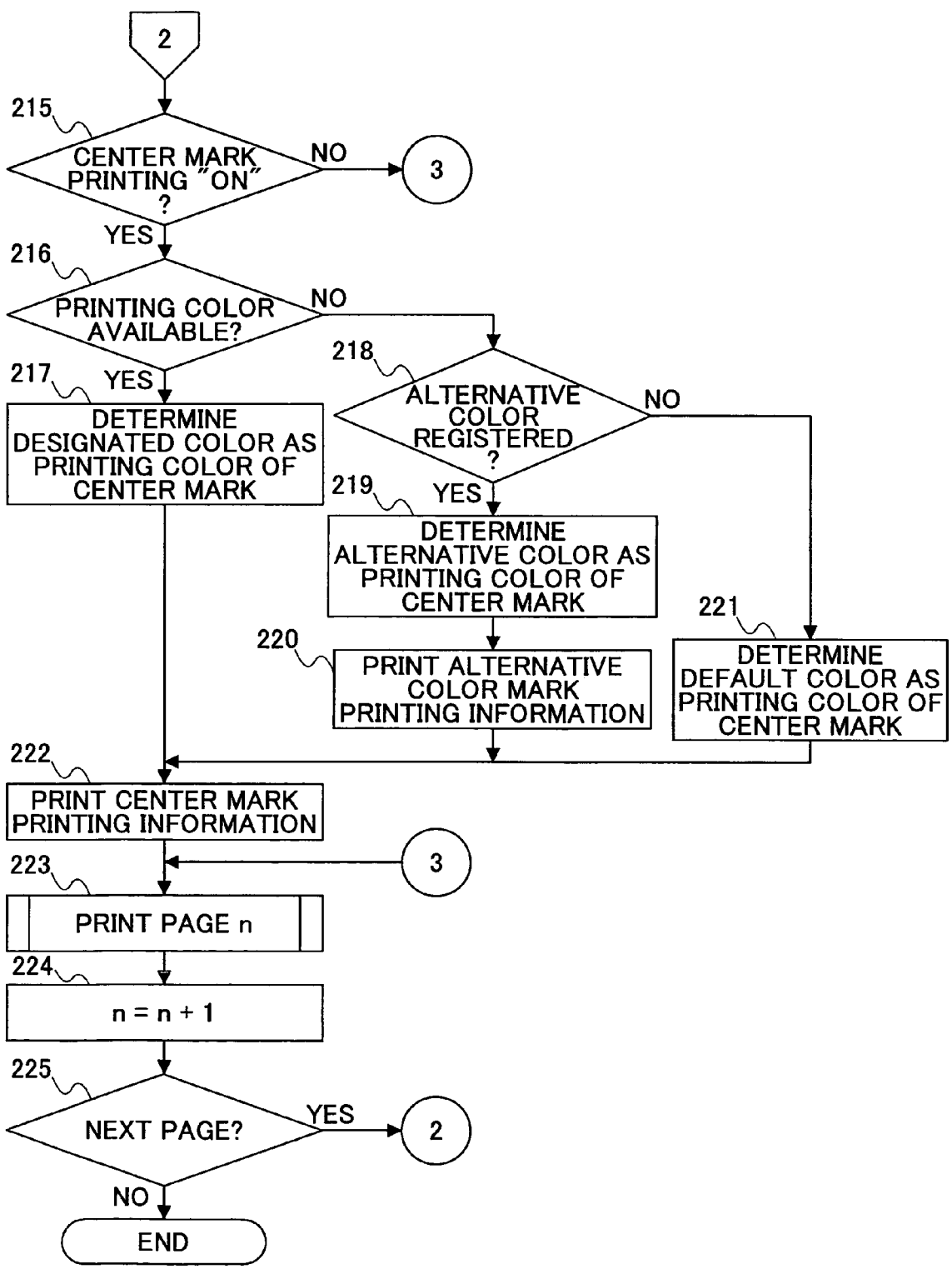
FIG. 7 is a flowchart showing the exemplary printing process (Step 107) continuing from FIG. 6.
Figure 8:
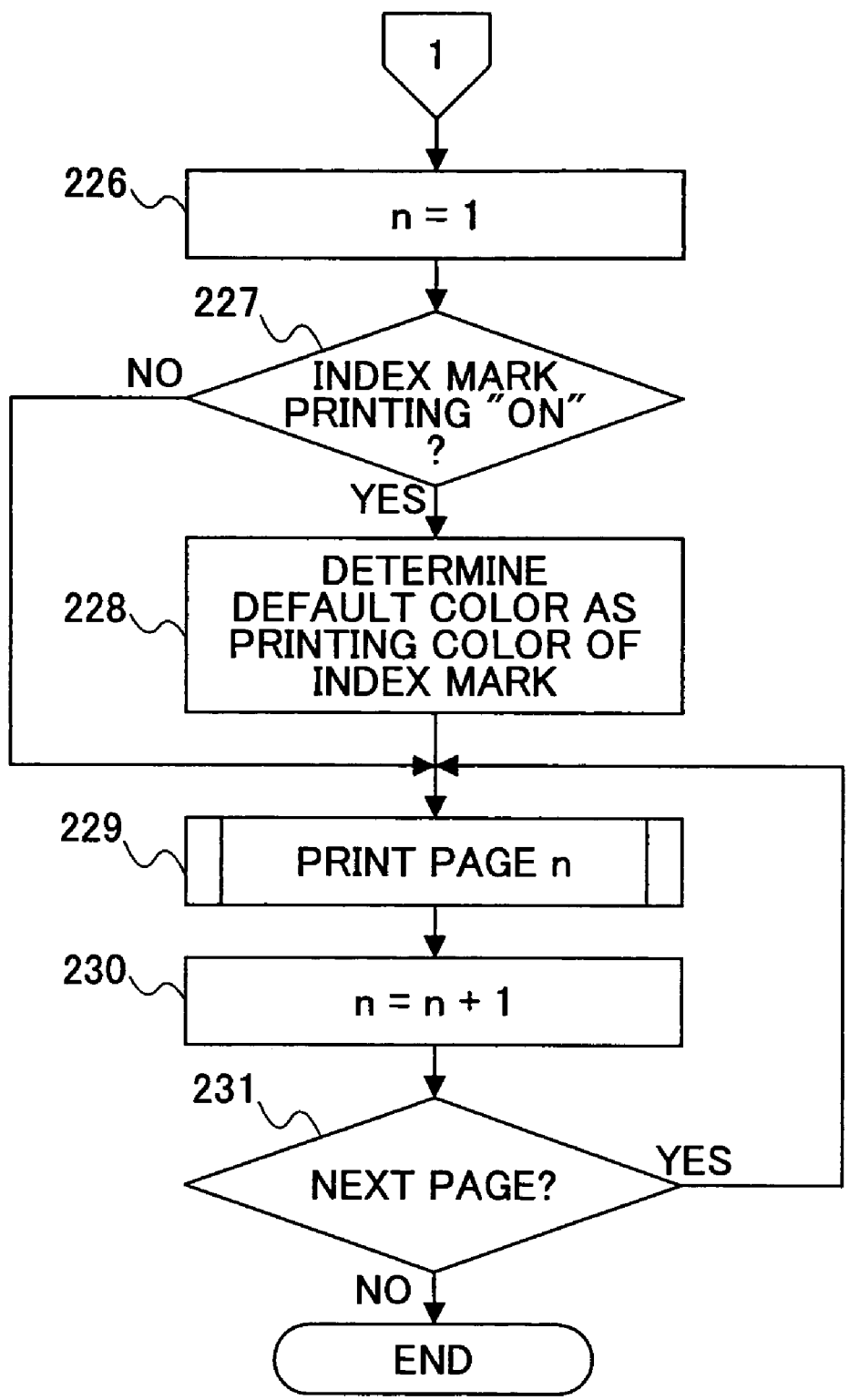
FIG. 8 is a flowchart showing an exemplary printing process (Step 107) continuing from FIG. 7.

FIGS. 6, 7, and 8 are block diagrams showing an example of the printing process of Step 107.

First, it is determined whether sender information obtained in the pre-transmission process (Step 103) is registered in the book mark designation information table (Steps 201, 202).

If the sender information is registered in the book mark designation information table, the index mark designation information corresponding to the sender is extracted (Step 203).

The counter n for managing the process target page number is initially set as "1" (Step 204). Then, the index printing flag is obtained from the apparatus specification information (See FIG. 3C) for determining whether index mark printing is set as "ON" (Step 205). When the index mark printing is set as "ON", it is determined whether the designated color according to the book mark designation information is available for use as the printing color (Step 206). If the designated color is available (YES in Step 206), the designated color is selected (designated) as the printing color of the index mark SM (Step 207).

In a case where the designated color according to the book mark designation information is unavailable for use as the printing color (e.g. lack of toner or ink) (NO in Step 206), it is determined whether there is significant information registered in the alternative color information in the book mark designation information, that is, whether there is a color designated as the alternative color (Step 208). If there is a color designated in the alternative color information (YES in Step 208), the designated color is selected (designated) as the printing color of the index mark SM (Step 209). Then, the alternative color mark printing information is printed to the print information of the corresponding page (Step 210). However, no alternative color mark printing information is printed when the alternative color mark printing flag in the book mark designation information is set as "OFF".

Furthermore, when it is determined that there is no significant information registered in the alternative color information in the book mark designation information (NO in Step 208), the default color is selected (designated) as the printing color of the index mark SM (Step 211).

After the printing color of the index mark is selected (designated), index mark printing information is printed to, that is, the index mark SM is printed on, the corresponding page (Step 212).

Next, by examining the center mark printing flag of the book mark designation information, it is determined whether to print the center marks CM1, CM2 (Step 215). If it is determined to print the center marks (YES in Step 215), it is then determined whether the color designated according to the book mark designation information is available to be used as the printing color (Step 216). If it is determined that the designated color is available (YES in Step 216), the designated color is determined as the center mark printing color (Step 217).

If it is determined that the designated color is unavailable (NO in Step 216), it is determined whether there is significant information registered in the alternative color information in the book mark designation information (Step 218). If there is a color designated in the alternative color information (YES in Step 218), the designated color is determined (designated) as the printing color of the center mark (Step 219). Then, the alternative color mark printing information is printed to the print information of the corresponding page (Step 220). However, in a case where the alternative color mark printing flag is in an "OFF" state, the alternative color mark printing information is not printed as the printing information. In addition, in a case where the alternative color mark printing information is already printed, the printing is not repeated.

If no significant information is registered in the alternative color information (NO in Step 218), the default color is determined (designated) as the printing color of the center mark (Step 221).

After the printing color of the center mark is determined (designated), center mark printing information is printed to, that is, the center marks CM1, CM2 are printed on, the corresponding page (Step 222).

Next, a printing process of stored image information for page n is performed (Step 223). In this process, if the index mark printing information and/or the center mark printing information is added, the added index mark printing information and/or the center mark printing information is also printed. Accordingly, the index mark SM, and/or the center marks CM1, CM2 are added and printed to the printing page.

Next, a value of 1 is added to the value of the counter n (Step 224). Then, it is determined whether there is a next printing page (Step 225). If there is a next printing page (YES in Step 225), the process returns to Step 215, and the printing process for the next printing page is performed.

If it is determined not to print the center mark on the next printing page (NO in Step 215), no additional center mark CM1, CM2 is printed on the next printing page, thereby, the process proceeds to Step 223 for printing the corresponding page. Furthermore, if it is determined that the index mark printing is "OFF" (NO in Step 205), the process proceeds to Step 215 and to the steps following Step 215.

If no sender information is registered (NO in Step 202), the value of counter n, indicative of the target process page, is initialized as "1" (Step 226) (FIG. 8). Then, an index mark printing flag of the apparatus specification information is obtained so as to determine whether the index mark printing is set as "ON" (Step 227).

If it is determined that the index mark printing is set as "ON" (YES in Step 227), a default color is determined as the printing color of the index mark, and index mark printing information is printed on the corresponding page (Step 228).

Then, stored image information for page n is printed (Step 229). When index mark printing information is added as printing information, the index mark printing information is also printed during this step. Accordingly, a corresponding page is printed having the index mark SM additionally printed thereto.

Then, a value of 1 is added to the value of counter n (Step 230). Then, it is determined whether there is a next printing page (Step 231). If there is a next printing page (YES in Step 231), the process returns to Step 229, and the printing process for the next printing page is performed.

If it is determined that the index mark printing is not set as "ON" (i.e. index mark printing "OFF") (NO in Step 227), no index mark is printed, for example, on the first page, thereby, the process proceeds to Step 229 for printing the corresponding page.

In consequence, according to the above-described embodiment of the present invention, the color for the index mark SM can be determined in correspondence with each sender. This enables the user receiving documents to clearly identify the sender of the documents, and to easily sort the received documents.

Furthermore, since the center marks CM1, CM2 may also be printed, the process of, for example, hole punching when sorting the received documents can be easily performed.

Since an alternative printing color is provided, the index mark and/or center mark can be printed with the alternative printing color even when there is a shortage of ink or toner for a prescribed printing color. Thereby, it is convenient in that the execution of a substitutional reception can be avoided. Since a mark indicative of the use of an alternative color is printed on the received document, the user can easily notice the use of the alternative color, and thereby the sorting of documents can be performed efficiently.

It is to be noted that although a G3 facsimile apparatus is employed in the above described embodiment of the present invention, a G4 (Group 4) facsimile apparatus or a complex machine including a facsimile function may alternatively be used.

Further, the present invention is not limited to these embodiments, but various variations and modifications may be made without departing from the scope of the present invention.

The present application is based on Japanese priority application No.2003-202273 filed on Jul. 28, 2003, with the Japanese Patent Office, the entire contents of which are hereby incorporated by reference.

What is claimed is:

1. A facsimile apparatus having a multi-color printing function, the facsimile apparatus comprising:
    an information registering part configured to register registration information including book mark printing colors used for printing a book mark corresponding to a sender of a plurality of senders;
    a determining part configured to determine, based on the registration information, whether to print the book mark when receiving image information from the sender; and
    a printing part configured to print the book mark corresponding to the sender,
    wherein the registration information includes information indicating alternative book mark printing colors to be used as alternative colors in a case where the book mark printing colors are unavailable,
    wherein an alternative book mark color mark is printed in the case where the alternative book mark printing color is used, and
    wherein the printed alternative book mark color mark indicates the unavailable book mark printing color.

2. The facsimile apparatus as claimed in claim 1, wherein the registration information includes index mark printing flags that indicate whether an index mark is to be printed, and an index murk printing color used for printing the index mark.

3. The Facsimile apparatus as claimed in claim 2, wherein the registration information includes alternative index mark printing color used as alternative colors with respect to the index mark printing colors in a case where the index mark printing colors are unavailable.

4. The facsimile apparatus as claimed in claim 3, wherein an alternative index mark color mark is printed in the case where the alternative index mark printing color is used.

5. The facsimile apparatus as claimed in claim 1, wherein the registration information includes center mark flags that indicate whether a center mark is to be printed, and a center mark printing color used for printing the center mark.

6. The facsimile apparatus as claimed in claim 5, wherein the registration information includes alternative center mark printing colors used as alternative colors with respect to the center mark printing colors in a case where the center mark printing colors are unavailable.

7. The facsimile apparatus as claimed in claim 6, wherein an alternative center mark color mark is printed in the case where the alternative center mark printing color is used.

8. A facsimile transmission means having a multi-color printing function, the facsimile transmission means comprising:
  means for registering registration information including book mark printing colors used for priming a book mark corresponding to a sender of a plurality of senders;
  means for determining, based on the registration information, whether to print the book mark when receiving image information from the sender; and
  means for priming the book mark corresponding to the sender,
  wherein the registration information includes information indicating alternative book mark printing colors to be used as alternative colors in a case where the book mark printing colors are unavailable;
  wherein an alternative book mark color mark is printed in the case where the alternative book mark printing color is used;
  wherein the printed alternative book mark color mark indicates the unavailable book mark printing color.

9. The facsimile transmission means as claimed in claim 8, wherein the registration information includes index mark printing flags that indicate whether an index mark is to be printed and an index mark printing color used for printing the index mark.

10. The facsimile transmission means as claimed in claim 9, wherein the registration information includes alternative index mark printing colors used as alternative colors with respect to the index mark printing colors in a case where the index mark printing colors are unavailable.

11. The facsimile transmission means as claimed in claim 10, wherein an alternative index mark color mark is printed in the case where the alternative index mark printing color is used.

12. The facsimile transmission means as claimed in claim 8, wherein the registration information includes center mark flags that indicate whether a center mark is to be printed, and a center mark printing color used for printing the center mark.

13. The facsimile transmission means as claimed in claim 12, wherein the registration information includes alternative center mark printing colors used as alternative colors with respect to the center mark printing colors in a case where the center mark printing color are unavailable.

14. The facsimile transmission means as claimed in claim 13, wherein an alternative center mark color mark is printed in the case where the alternative priming center mark color is used.

15. A facsimile transmission method comprising the steps of:
  a) registering registration information including book mark printing colors used for printing a book mark corresponding to a sender of a plurality of senders;
  b) determining, based on the registration information, whether to print the book mark when receiving image information from the sender; and
  c) printing the book mark corresponding to the sender;
  wherein the registration information includes information indicating alternative book mark printing colors to be used as alternative colors in a case where the book mark printing colors are unavailable;
  wherein an alternative book mark color mark is printed in the case where the alternative book mark printing color is used;
  wherein the printed alternative book mark color indicates the unavailable book mark printing color.

16. The facsimile transmission method as claimed in claim 15, wherein the registration information includes index mark printing flags that indicate whether an index mark is to be printed, and an index mark printing color used for printing the index mark.

17. The facsimile transmission method as claimed in claim 16, wherein the registration information includes alternative index mark printing colors used as alternative colors with respect to the index mark printing colors in a case where the index mark printing colors are unavailable.

18. The facsimile transmission method as claimed in claim 17, wherein an alternative index mark color mark is printed in the case where the alternative index mark printing color is used.

19. The facsimile transmission method as claimed in claim 15, wherein the registration information includes center mark flags that indicate whether a center mark is to be printed, and a center mark printing color used for printing the center mark.

20. The facsimile transmission method as claimed in claim 19, wherein the registration information includes alternative center mark printing colors used as alternative colors with respect to the center mark printing colors in a case where the center mark printing colors are unavailable.

21. The facsimile transmission method as claimed in claim 20, wherein an alternative center mark color mark is printed in the case where the alternative printing center mark color is used.

* * * * *